United States Patent
Kellerman et al.

(10) Patent No.: US 9,355,253 B2
(45) Date of Patent: May 31, 2016

(54) SET TOP BOX ARCHITECTURE WITH APPLICATION BASED SECURITY DEFINITIONS

(71) Applicants: Marcus C. Kellerman, San Diego, CA (US); Xuemin (Sherman) Chen, Rancho Santa Fe, CA (US)

(72) Inventors: Marcus C. Kellerman, San Diego, CA (US); Xuemin (Sherman) Chen, Rancho Santa Fe, CA (US)

(73) Assignee: Broadcom Corporation, Irvine, CA (US)

(*) Notice: Subject to any disclaimer, the term of this patent is extended or adjusted under 35 U.S.C. 154(b) by 423 days.

(21) Appl. No.: 13/733,186

(22) Filed: Jan. 3, 2013

(65) Prior Publication Data

US 2014/0115718 A1 Apr. 24, 2014

Related U.S. Application Data

(60) Provisional application No. 61/715,785, filed on Oct. 18, 2012, provisional application No. 61/725,964, filed on Nov. 13, 2012, provisional application No. 61/733,958, filed on Dec. 6, 2012, provisional application No. 61/734,700, filed on Dec. 7, 2012, provisional application No. 61/745,065, filed on Dec. 21, 2012.

(51) Int. Cl.
*H04L 29/06* (2006.01)
*G06F 21/60* (2013.01)
*H04N 21/443* (2011.01)
*H04N 21/4627* (2011.01)
*H04N 21/81* (2011.01)

(52) U.S. Cl.
CPC .............. *G06F 21/60* (2013.01); *H04N 21/443* (2013.01); *H04N 21/4627* (2013.01); *H04N 21/8166* (2013.01)

(58) Field of Classification Search
CPC . G06F 21/00; G06F 12/0817; G06F 12/6272; G06F 12/6254; G06K 9/0006; G06C 9/00158
See application file for complete search history.

(56) References Cited

U.S. PATENT DOCUMENTS 7,673,074 B1 * 3/2010 Sebastian et al. ............. 709/250
2005/0064846 A1 3/2005 Karaoguz et al.

(Continued)

FOREIGN PATENT DOCUMENTS

EP 2323338 A1 5/2011

OTHER PUBLICATIONS

Kuzmanovic, et al.; Google's Android as an Application Environment for DTV Decoder System; IEEE 14th International Symposium on Consumer Electronics (ISCE); Jun. 7, 2010; pp. 1-5.

(Continued)

*Primary Examiner* — Joseph P Hirl
*Assistant Examiner* — Leynna Truvan
(74) *Attorney, Agent, or Firm* — Garlick & Markison; Bruce E. Garlick

(57) ABSTRACT

A media processing device, such as a set top box, having selectable hardware and software components for forming media pathways compliant with security definitions provided by downloaded or preinstalled software applications. Such applications may include, for example, a downloadable conditional access security or DRM element/definition. A corresponding certification process can entail certifying a portion of an overall secure pathway, with one or more applications providing the final portion of the certification. Alternatively, predefined conditional access mechanisms are provided, with an application establishing which mechanism is to be used. In various embodiments, a set top box or resident software application may exchange capabilities with other devices in a media consumption network to compare against the requirements of the software application. Once the information exchange is complete, the software application may select which one or more modes of operation or media pathways, if any, that it will permit.

20 Claims, 12 Drawing Sheets

(56) References Cited

U.S. PATENT DOCUMENTS

2008/0141336 A1* 6/2008 Haller .............................. 726/1
2008/0209212 A1 8/2008 Ditzman et al.
2012/0173877 A1 7/2012 Pendakur et al.

OTHER PUBLICATIONS

European Patent Office; European Search Report; EP Application No. 13004996.8; Jan. 9, 2015; 3 pgs.

* cited by examiner

End-to-End Security and Certification Support 300

Pathway Configurations 302

| Components(s) | Security Level 1 | Security Level 2 | ooo | Non-Secure Default |
|---|---|---|---|---|
| CPU Options | CPU1 | CPU2 | | CPUx |
| Memory Options | MEM1 | MEM2 | | MEMx |
| Accelerators | ACC1 | ACC2 | ooo | ACCx |
| I/O's | I/O 1 | I/O 2 | | I/O x |
| DRM Elements* | DRM1 | DRM2 | | --- |
| CA Elements* | CA1 | CA2 | | --- |
| ooo | ooo | ooo | | ooo |

\* may be provided or specified by one or more software applications

FIG. 3A

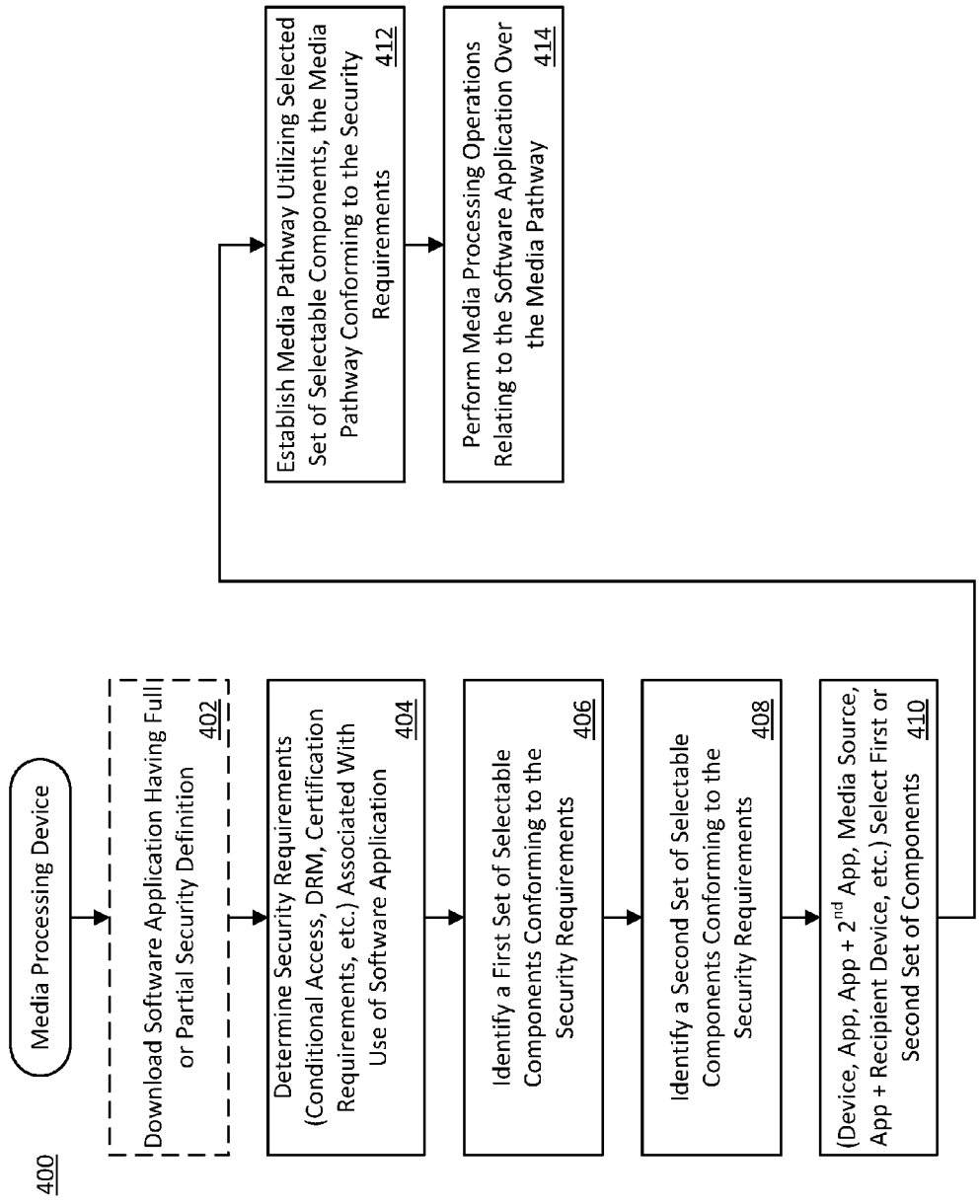

SET TOP BOX ARCHITECTURE WITH APPLICATION BASED SECURITY DEFINITIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/715,785, entitled "INTEGRATION OF UNTRUSTED FRAMEWORK COMPONENTS WITH A SECURE OPERATING SYSTEM ENVIRONMENT," filed Oct. 18, 2012.

2. U.S. Provisional Patent Application Ser. No. 61/725,964, entitled "INTEGRATION OF UNTRUSTED APPLICATIONS AND FRAMEWORKS WITH A SECURE OPERATING SYSTEM ENVIRONMENT," filed Nov. 13, 2012.

3. U.S. Provisional Patent Application Ser. No. 61/733,958, entitled "SECURITY AND CERTIFICATION IN A SET TOP BOX DEVICE HAVING A MIXED OPERATING SYSTEM OR FRAMEWORK ENVIRONMENT," filed Dec. 6, 2012.

4. U.S. Provisional Patent Application Ser. No. 61/734,700, entitled "SET TOP BOX ARCHITECTURE SUPPORTING MIXED SECURE AND UNSECURE MEDIA PATHWAYS," filed Dec. 7, 2012.

5. U.S. Provisional Patent Application Ser. No. 61/745,065, entitled "SET TOP BOX ARCHITECTURE WITH APPLICATION BASED SECURITY DEFINITIONS," filed Dec. 21, 2012.

BACKGROUND OF THE INVENTION

1. Technical Field of the Invention

The present invention relates generally to media processing systems and, more particularly, to establishing and maintaining media pathways that are compliant with security definitions provided by one or more software applications.

2. Description of Related Art

Attempts to accommodate relatively untrusted software applications or frameworks in certain types of devices may complicate applicable certification processes that are performed in accordance with one or more industry defined certification standards or testing procedures. For example, vendor certification of many set top boxes used by cable operators is conducted via rigid certification processes that test interoperability and security compliance for devices that implement specifications such as DOCSIS®, PacketCable™, CableHome™, and OpenCable™. Successful certification of such devices typically requires full end-to-end security. Likewise, digital rights management (DRM) and other technologies implemented in a particular device or component (such as a system-on-a-chip) may require distinct certification processes which do not allow certain interactions with an unsecured operating system (OS) environment or software framework. When implemented in a cable set top box, cable modem, media terminal adapter or like cable service device, certain specifications may require that a digital certificate be embedded in the device at the time of manufacture. Such certificates underpin a number of security features including device authentication and content integrity. By way of example, a digital certificate embedded in such devices helps prevent pirating of services by allowing a content provider or service operator to authenticate a device requesting services.

In general, any unsecured portions of a media pathway in a set top box or like device, if not isolated, will cause the certification of such pathway to fail. Most conventional set top boxes are designed to provide a single secure and certified pathway through the various elements or components of the device. In some recent multi-processor set top boxes, a conventional certified pathway is separated from untrusted components by creating a hardware boundary between the two. In particular, a first processing module is utilized to provide secure functionality (e.g., decoding operations), while a separate processing module with a lower security level is used to support an untrusted framework.

As is known, a software framework may provide application programming interface functionality and services that are not offered by an underlying operating system, and may thereby offer a level of platform independence in certain implementations. Frameworks are often designed to be a reusable and adaptable software system or subsystem. For example, ANDROID™ ("Android") has become one of the fastest-growing operating systems/frameworks for mobile devices. Android, which builds on contributions from the open-source Linux community, provides development tools and reusable components for building applications that can be deployed across many different types of devices, such as a smartphone or tablet device.

A typical Android framework is a "multi-user" Linux-based system in which each Android application is a different "user" having code that runs in general isolation from other applications. Such process isolation (or application "sandbox") provides a certain level of security. However, various components, processes, threads, etc. used by an application may not entail sufficient protection when integrated in a set top box-type device, resulting in Android being considered an "untrusted" framework when used in such devices. For example, an application that visits an arbitrary web page or receives code from an unverified third party may result in untrusted JavaScript code being executed on a set top box, possibly with elevated privileges. Such code might exploit weakness in other code (e.g., browser code) and receive unauthorized access to file systems, etc., thereby compromising the security of a device, exposing protected data or introducing system instability.

As indicated above, the processing unit of some devices may have multiple processors or processing cores in order to provide higher performance and/or multi-tasking capabilities. In some of these multi-processor systems, when multiple applications or programs are running, access control is typically needed to separate the functionality of the applications running on multiple processors. Separation or segregation of different applications and/or tasks running on different processors helps to ensure that one application does not interfere with the execution of another. Likewise data assigned to one processor should not be accessed by another processor, unless that data is shared between the two processors. Such separation is typically handled through use of virtual memory, with each process having a unique view of memory that is not accessible from outside processes. Hardware access can be handled through a kernel or device driver interface, which provides some level of security. Even in a multi-processor system in which one processor environment provides trusted or secure operations while another operates in an unsecure or restricted environment, however, there can be a substantial possibility of an incursion from the unsecure zone into the secure zone when the operating system is managing the separation.

For example, in a set top box that allows a user to receive television signals and also allows the user to access the Internet, the secure environment may run applications (including a secure set top box application) pertaining to the reception, decryption and display of certain channels or content provided by a cable or satellite provider or other service operator. The unsecure environment in the set top box may execute applications, such as Android-based applications, that allow a user to access the Internet for web browsing, gaming, etc. In this example, the content provider would generally not want the user or anyone else to access the applications pertaining to broadcast or premium channels. However, if there is commonality in software that controls the accesses to both environments, such as running the same operating system to manage accesses in both environments, then there may be a heightened risk of access violations. Such violations, whether intentional or non-intentional, could result in an unsecure breach into the secure applications of the set top box, such as a web-originated intrusion into protected television channels.

Accordingly, there is a need to obtain an efficient way to integrate untrusted frameworks and applications with a secure operating system environment such as that of a set top box device, while also maintaining compliance and flexibility with respect to applicable certification procedures and security measures.

BRIEF DESCRIPTION OF THE SEVERAL VIEWS OF THE DRAWINGS

FIG. 3A illustrates exemplary media pathway configurations in accordance with an embodiment of the present disclosure.

FIG. 4 is a logic diagram of a method for establishing media pathways using application based security requirements in accordance with an embodiment of the present disclosure.

DETAILED DESCRIPTION OF THE INVENTION

While certain embodiments are described in conjunction with an Android framework and/or Linux operating system, other embodiments of the present invention may be practiced with a variety of current or future operating systems/kernels and frameworks, and employ a variety of computing circuits, devices, servers and/or systems that might utilize multiple processors, processing cores and/or processing circuits. Further, certain of the illustrations herein describe a processing module, a processor or a CPU (e.g. CPU1, CPU2) for a device that provides a processing function in the described embodiments. However, it is appreciated that a variety of other devices and/or nomenclature may be used in other embodiments to provide for the processing function in practicing the invention. The invention may be readily adapted to other usages where multiple processing environments (zones, domains, etc.) exist, in which separation and/or segregation between two or more zones is desired. Likewise, while certain embodiments are described as implemented by a set top box (STB) or like media processing device performing trusted media processing operations, the novel architectures and methodologies are applicable in whole or in part to other devices, including media consumption devices such as PVR's, DVD players, access points, televisions, computing devices, smartphones, etc. As used herein, conditional access (CA) refers to the protection of content by requiring certain criteria to be met before granting access to this content, while DRM refers to any technology that inhibits uses of digital content that are not desired or intended by the content provider.

A novel set top box or other media processing device architecture employing application-based security definitions is described herein. In various embodiments of the disclosure, instead of an end-to-end security definition being managed by a service operator or defined content itself, software applications (downloaded or preinstalled) utilized by the media processing device include a full or partial security definition. For example, each such application may include a downloadable conditional access security (dCAS) or downloadable DRM element/definition. A corresponding certification process might entail, for example, certifying a part of an overall secure pathway, with one or more applications providing the final portion of the certification. Alternatively, a predefined plurality of conditional access mechanisms may be provided, with a (downloaded) application establishing which mechanism is to be used. It may then be possible to certify a secure "boundary" without regard to the conditional access requirements of a particular company or media.

Figure 1:
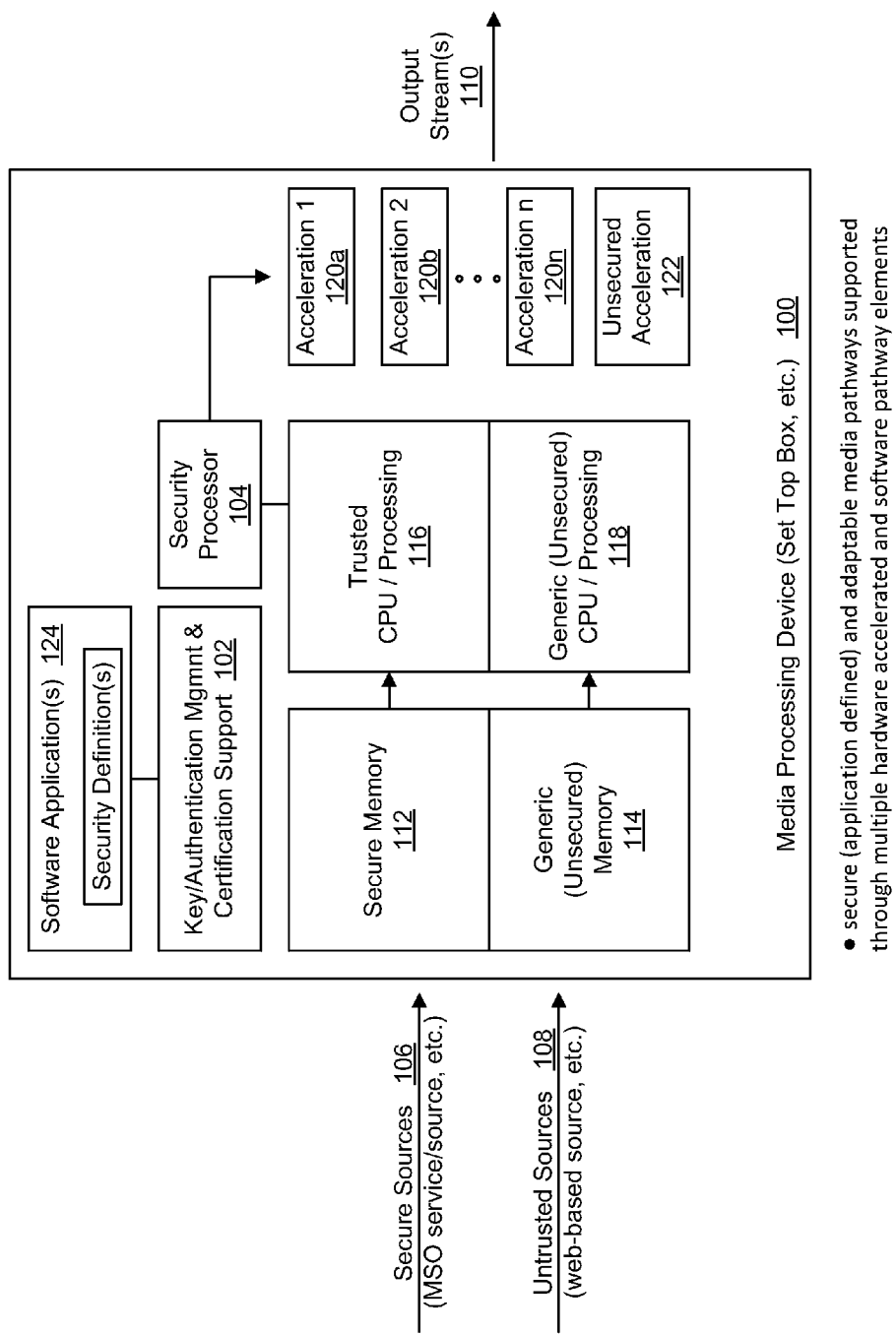
FIG. 1 illustrates a media processing device utilizing security definitions provided by software applications in accordance with an embodiment of the present disclosure.

Referring now to FIG. 1, a media processing device 100 utilizing security definitions provided by software applications 124 in accordance with an embodiment of the present disclosure is shown. In this embodiment, security definitions provided by one or more software applications 124 are utilized in the key management and certification support system 102 to establish secure/certified and unsecure media pathways supported through multiple hardware accelerated and software pathway elements. For example, key management functionality may entail associating different keys with different functions, enabling or controlling certain interfaces, controlling how keys are generated, stored and accessed, etc. In addition, the key management and certification support system 102 can register certified CA and DRM systems (which may be defined, in whole or part, by software applications 124) and associated pathways and permitted operations in the media processing device 100. The security processor 104 may service pathway configuration requests from the key management and certification support system 102, and may be further operable to detect attempts from the restricted operating system environment to exploit the media pathway or nodes thereof in an unauthorized manner, restrict access to a certified pathway, etc.

In operation, processing of content and application software from trusted sources 106 (such as service operator) may be restricted to trusted or certified pathway components such as secure memory 112, trusted/secure processing circuitry 116, and one or more secure hardware/software acceleration functions 120a-n in order to generate an output stream(s) 110. Likewise, processing of content and application software from untrusted sources 108 (such as certain web-based sources) may be restricted to untrusted components such as generic or unsecured memory 114, generic or unsecured processing circuitry 118, and unsecured hardware/software acceleration functions 122. Depending on requisite security levels and other considerations, the effective boundaries between trusted and untrusted components may fluctuate in a dynamic manner as described more fully below.

In a media processing device 100 capable of supporting multiple hardware accelerated and software pathway elements, an entire secure or unsecure pathway can be adaptively constructed and adapted from pathway configurations providing, for example, maximum hardware acceleration and highest output quality to non-accelerated, low output quality. Each pathway node may have one or more software and/or one or more hardware underpinnings that enable servicing of multiple simultaneous media streams.

Figure 2:
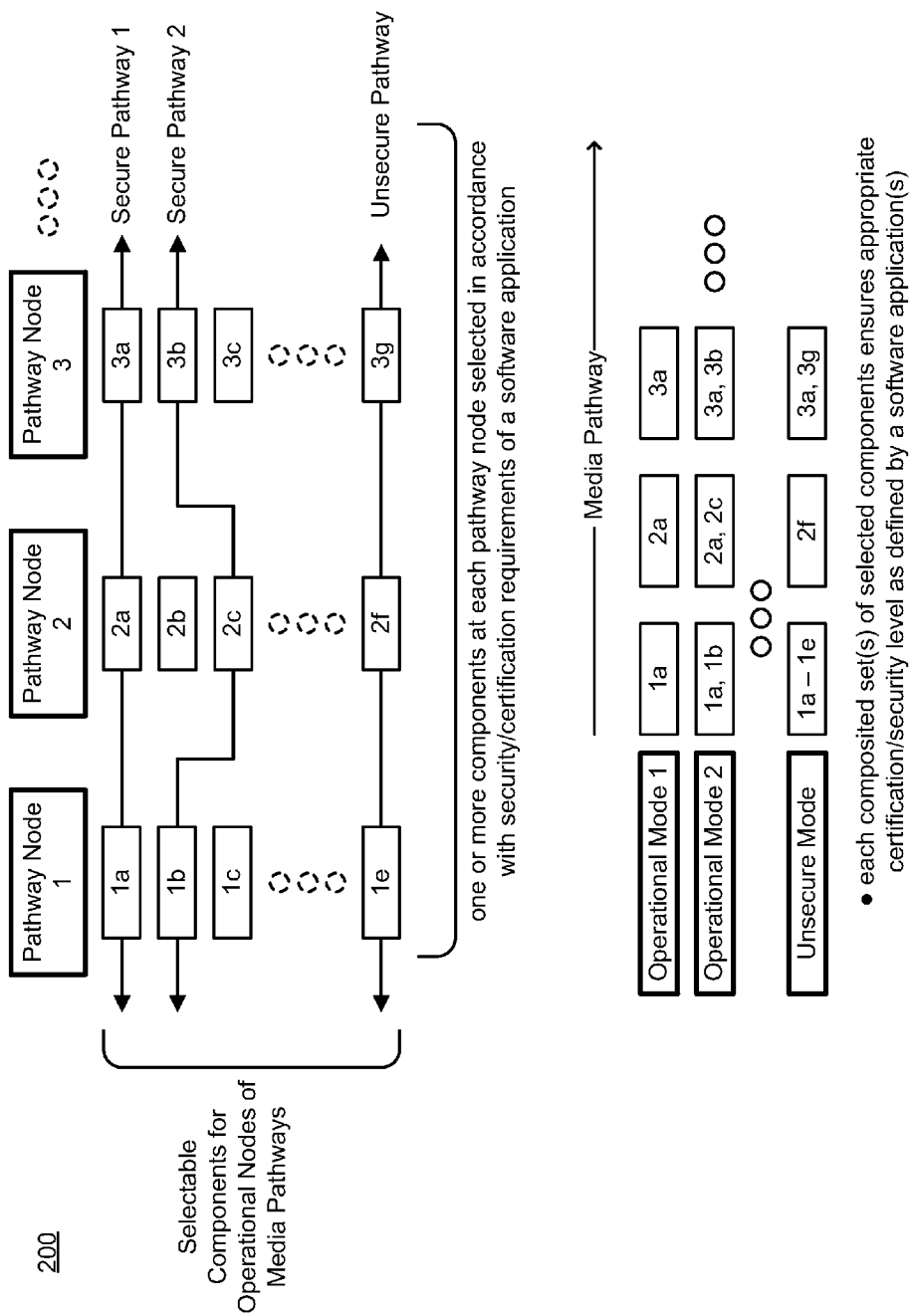
FIG. 2 illustrates media pathways of varying security levels established in accordance with an embodiment of the present disclosure.

FIG. 2 illustrates media pathways of varying security levels established in accordance with an embodiment of the present disclosure. In this embodiment, hardware/software components at each operational pathway node are selected in accordance with a desired operational mode. In general, each operational mode corresponds to a particular security or certification service boundary definition(s) and key/authentication and security management scheme for managing resources such as hardware acceleration functions and software API's. For example, an operational mode may relate to a copy-protection certification scheme that requires a certain DRM element or guaranteed amount of secure memory and processing resources.

In this manner, for example, an application can be installed which completes certification requirements associated with a particular service operator or content provider. Base certified pathways may be utilized (as specified by the software application) along with additional requirements (that may also be specified by the software application) in order to complete a certified pathway.

Selection and management of the respective components within the device or system to effectuate delivery of signals or media may be made based upon the secure or unsecure nature of a component, current or anticipated availability of components, historical availability of components, the performance level and power consumption of components, etc. Different sets of components may be adaptively employed to ensure composited compliance with one or more security/compliance constraints provided by a software application(s). Such constraints may be applied, for example, on a source or content specific basis to establish multiple secure and unsecure pathways (such as might be used in multistreaming applications). As described more fully below, security or compliance definitions to a given media item or software application may be flexible enough to allow crossover operations between restricted and privileged portions of a media processing device.

FIG. 3A illustrates exemplary media pathway configurations 302 in accordance with an embodiment of the present disclosure. In this embodiment, selection of components that form the pathway configurations corresponding to a given security level is governed by end-to-end security and certification support 300. Available components of a device may include, by way of example and without limitation, CPU/processing options, memory options, input/output interfaces, software APIs, hardware acceleration functions for performing video encoding, video decoding, rendering of 2D and 3D graphics, digital rights management, encryption, decryption, etc. Some components may perform or enable multimedia functionality such as audio/video capture, format conversion, playback, saving and streaming. Further, a given pathway may incorporate DRM or conditional access elements that are supplied or specified by a particular software application.

In some embodiments, it is noted that components may have associated quality and security characteristics. The security characteristics may involve specific functionality within such component, but may also involve the underlying system security. For example, a given pathway node may have a certified, secure dedicated hardware component, or a certified, secure software component if running on underlying secure hardware (e.g., a secure processor). If running on unsecure hardware, the same (or nearly so) secure software component might be deemed only partially secure or unsecure. Security levels of currently available pathways might also be constrained, and dynamic pathway adaptations may be triggered by various limitations or resource competition.

In one example, depending on the multi-stream demands, dynamic adaptation of overall resource pathways can be performed to support, for example, simultaneous decoding, encoding or transcoding pathways. Further, certain device and framework functional blocks (including hardware acceleration components) can have multiple processing options (hardware, software and combinations thereof) which may each coexist and be supported with duplicate counterparts (e.g., hardware copies and software instancing). Each such block can have particular security and performance quality characteristics. Based upon such characteristics and current availability (in view of other pre-existing stream pathways), further pathways can be constructed and dynamically adapted having various overall performance and security qualities. So long as an end-to-end pathway meets minimum security requirements, such as imposed by an application, a service operator or content provider, a pathway may be commissioned to establish or replace a current pathway.

Further, in certain embodiments, such as simultaneous multistreaming environments, multiple software applications may interact at various media pathway nodes to guarantee end-to-end security at levels required to support multiple media flows. Such software applications may be internal and/or external to a host media processing device.

Figure 3B:
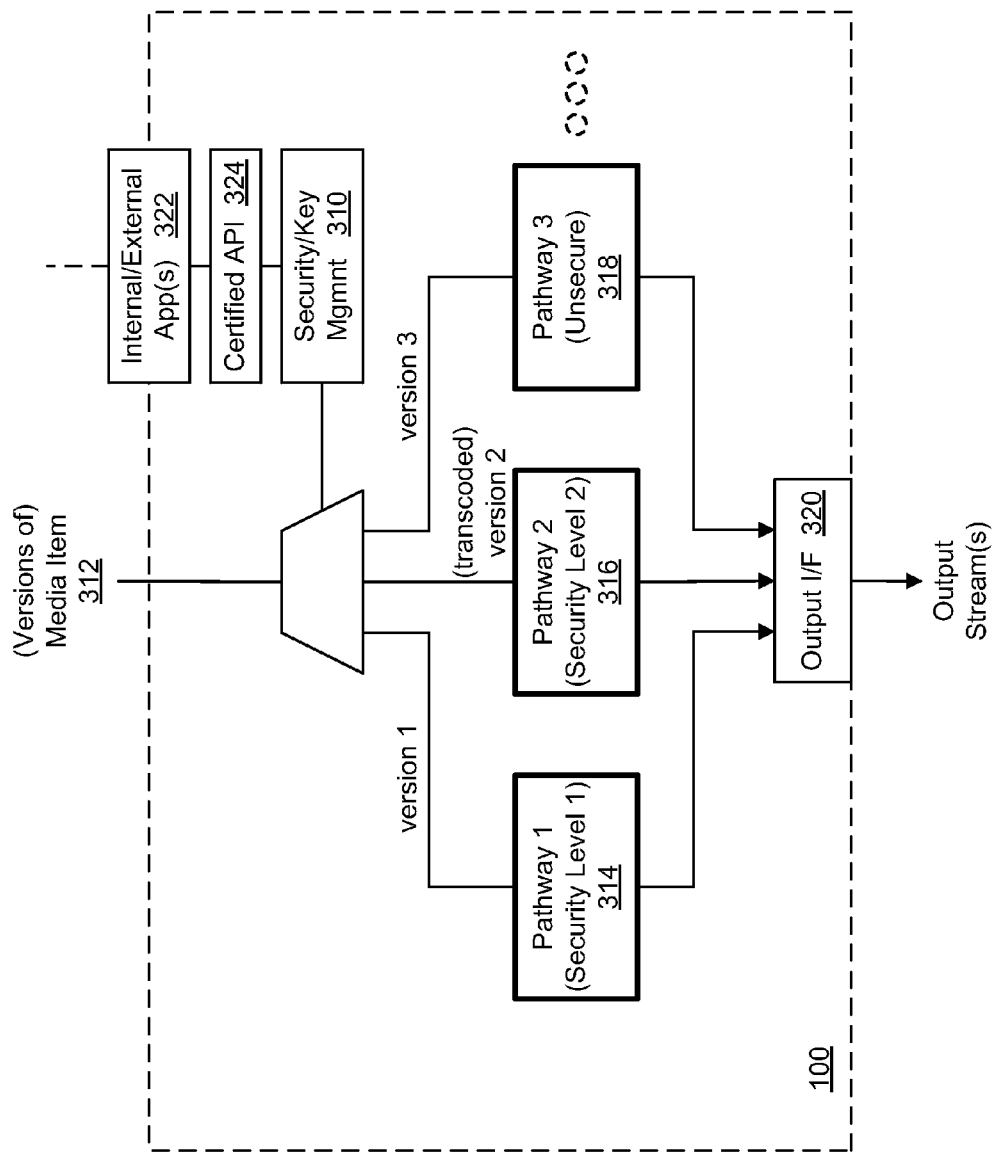
FIG. 3B illustrates media pathways compliant with various security requirements of software applications in accordance with an embodiment of the present disclosure.

FIG. 3B illustrates media pathways compliant with various security requirements of software applications in accordance with an embodiment of the present disclosure. In this embodiment, security and key management functionality 310 operates in conjunction with one or more internal/external software applications 322 to establish first and second secure pathways 314 and 316 providing a first and second level of security, respectively, as well as a third, unsecure pathway 318. Various pathways may be selected for simultaneous processing and delivery (at an output interface 320) of one or more versions of a media item 312 to one or more recipient devices. In the illustrated embodiment, security definitions provided by software applications 322 are communicated to the security and key management functionality 310 via a certified application programming interface (API) 324.

In various embodiments, a set top box or like device (or a resident software application itself) may exchange capabilities with other devices in a media consumption network (e.g., PVR's, DVD players, access points, televisions, computing devices, smartphones, etc.) to compare against the requirements of the software application. Such exchanges may occur, for example, between counterpart software applications residing on a set top box and recipient device. Once the information exchange is complete, the software application may select which one or more modes of operation, if any, that it will permit. If the set top box cannot support such modes (due to resource competition or otherwise), such modes become unavailable. If available, a set of modes of operation can be selected and dynamically switched to other of such modes on the fly during a media stream delivery, which may require coordination with the application or the source to support the transition (and possibly requiring quality changes in the media stream).

In this manner, for example, an application can be installed which completes certification requirements associated with a particular service operator or content provider. Base certified pathways may be utilized (as defined by the software application) along with additional requirements that may also be specified by the software application in order to complete a certified pathway.

In one example, a service operator or content provider may simultaneously deliver multiple versions (perhaps of different quality) of a media item or broadcast for delivery via a software application over a "platinum" pathway, a "gold" pathway and an uncertified pathway. In addition, different versions (e.g., versions 1-3) of a media item may be available supported by differing levels of security or quality of service (QoS). For example, a high definition or 3D version of a movie may have higher security requirements than a lower resolution version of the movie. In certain embodiments, if the media processing device is unable to support delivery of a high definition version of a media item, the item might be delivered via a lower security pathway that utilizes transcoding functions to produce a lower quality version that can be delivered by the device. Alternatively, a media source or content provider may provide the differing versions of a media item for selective or adaptive delivery based on the characteristics (such as QoS) or security level of an available media pathway. Further, content or portions of content from a particular media source may be deliverable via a relatively unsecure pathway. For example, a movie streaming service may place no restrictions on movie trailers, the first few minutes of a movie, lower resolution versions of a movie, etc.

It is also noted that security requirements relating to a particular media item may be updated or modified over time. That is to say, pathway selection and adaptation may be based upon characteristics of a media item, media recipient, media source, characteristics of other media streams in a multi-stream environment, pathway component availability, overall device performance, etc., that may vary over time such that any given consideration may have a relatively higher weight at one time and a relatively lower weight at another time. In addition, different respective considerations may be employed at different respective times.

In some implementations, a media processing device might offer multiple secure and unsecure media pathway constructs from which a subset might be acceptable for a particular media item or media stream delivery. As additional streams are added, prior streams may limit the overall acceptable subset. Pathway adaptation and arbitration may cause an ongoing stream to use a different media pathway construct to make room for the new stream. Pathway acceptability may be determined and managed by a software application, the media source, media processing device, or by the content itself (or related metadata).

In addition to associated security characteristics, components in a pathway construct may have inherent output quality characteristics. Thus, an acceptable pathway from a security standpoint may carry with it a corresponding quality. For example, a relatively low security pathway might be limited to use with dated movie releases, lower resolutions or frame rates, embedded or overlaid advertising, etc.

As will be understood, the embodiments of disclose described herein may apply to both upstream and downstream communications. More specifically, an upstream pathway portion, a downstream pathway portion and a middle portion including a media processing device may be configured in accordance with end-to-end security requirements. Alternatively, or for a given media item, portions of a media pathway configuration may have differing levels of associated security, such as a secure upstream portion and a relatively unsecure downstream portion (possibly involving a second tier of certification or an uncertified mode of operation). As will be appreciated, many other combinations are possible.

In one such example, a pay-per-view type of media stream requiring full end-to-end security may be interrupted by changing a channel to a normal broadcast television channel. This channel may entail full service operator head-end to set top box security, but allow unsecure set top box to television media delivery. Tuning the channel again to (or otherwise selecting) a freely distributed Internet video source might permit fully uncertified and unsecure media pathways from a server source to the television. Similarly, interacting with the set top box to select a PVR source or content from a tethered DVD player might permit use of fully uncertified/unsecure pathways. As noted, the imposition/permission of available security levels might be dictated by the media itself (or in associated metadata) or managed by the media source.

In certain implementations, a content provider may evaluate downstream security capabilities and offer multiple pathway constructs along with various pricing options. Upon user selection (e.g., via interaction with a set top box or software application), a particular pathway construct may be enabled. Further, an interface may be provided to indicate active pathway options. Selection of an additional media source might trigger such interface to, for example, prioritize one pathway construct over another, force a PVR "non-real time" delivery (postponed viewing), increase security and cost associated with a particular pathway construct, etc.

FIG. 4 is a logic diagram of a method 400 according to an embodiment of the present disclosure for establishing media pathways using application based security requirements in a media processing device such as a set top box having a plurality of selectable pathway components. In step 402, a software application having a full or partial security definition is downloaded to the device. Alternatively, the software application may be pre-installed or otherwise incorporated in the device. Next, in step 404, security or certification requirements associated with use of the software application are determined. Such requirements may comprise conditional access or DRM elements. In various embodiments, for example, the security requirements may correspond to requirements of an established or industry standard certification or testing procedure, requirements of a conditional access system utilized by a service operator, etc. Similarly, the security requirements may correspond to a certification requirement for processing and delivery operations involving a particular content/media item or class of content/media items.

In step 406 (which may precede step 404 in some embodiments) a first set of selectable device hardware/software components (such as hardware accelerators, a/v decoders, DRM functions, decryption/encryption blocks, etc.) is identified, the set of components conforming to security requirements provided by the software application. A second set of such components is then identified in step 408. Next, in step 410, at least one of the set of components is selected for use in establishing (step 412) a media pathway conforming to the security or certification requirements identified in step 404. Selection of the set of components may be performed by the media processing device (using the security/certification requirements), by software application itself, by the software application in conjunction with other external/internal software applications (such as might be installed on a recipient device), by a media source acting through the software application, etc. After the media pathway is established, it is then utilized as shown in step 414 to perform media processing operations relating to the software application.

Figure 5:
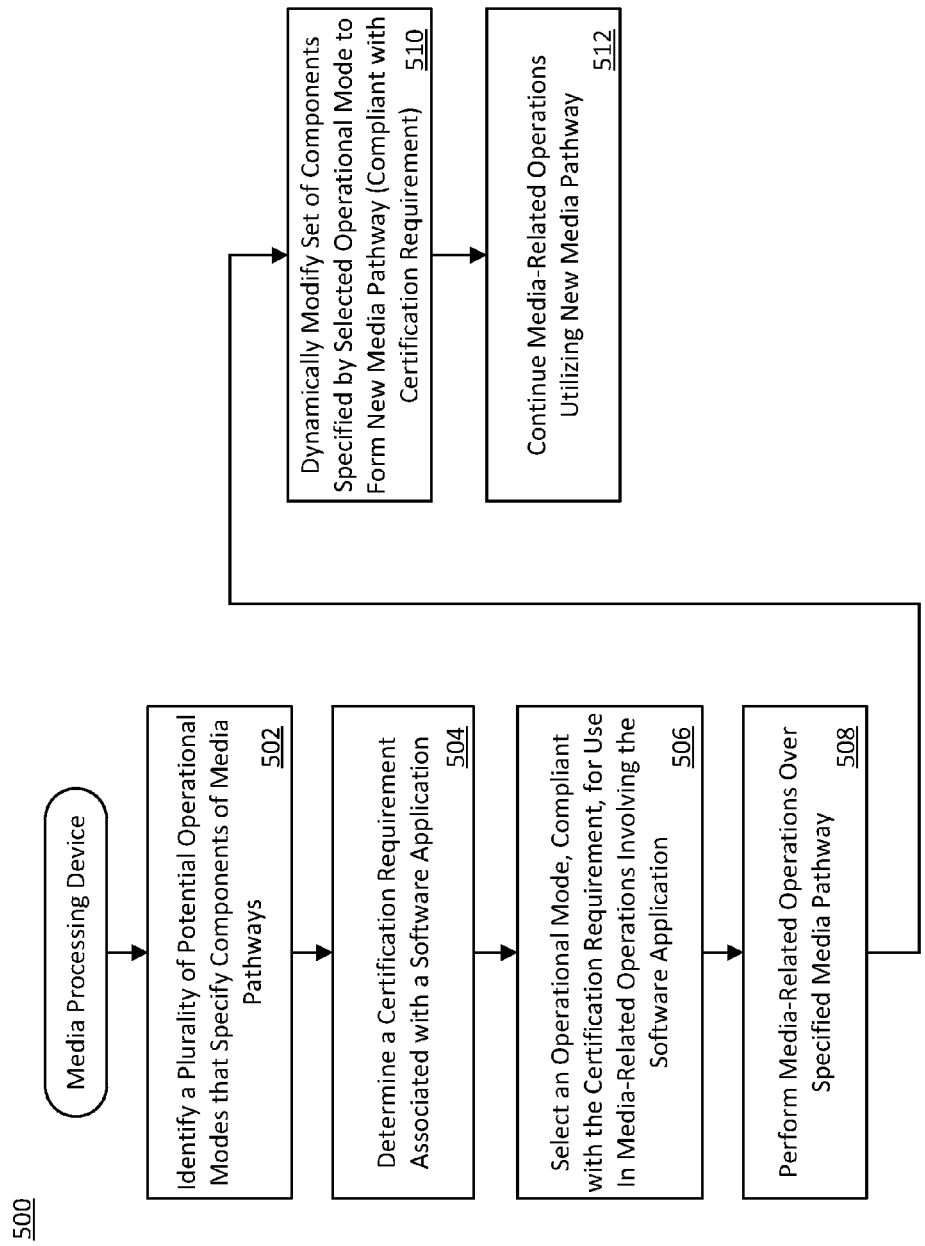
FIG. 5 is a logic diagram of a method for dynamically establishing alternate media pathways in accordance with an embodiment of the present disclosure.

FIG. 5 is a logic diagram of a method 500 according to an embodiment of the present disclosure for dynamically establishing alternate media pathways in a media processing device such as a set top box having a plurality of selectable components relating to operational nodes of the pathway. In step 502, a plurality of potential operational modes are identified by the device, each of the operational modes specifying a set of components that may be utilized to form media pathways providing varying levels of security. Next, in step 504, a certification requirement associated with an installed or downloadable software application is determined for use in selecting an operational mode (step 506). The selected operational mode can be utilized to establish a media pathway(s) that is compliant with the certification requirement. In step 508, media-related operations (such as receiving and modifying a video or movie for delivery to a recipient device) involving the software application are commenced over the specified pathway.

As shown in step 510, in this embodiment of the disclosure the set of components specified by the selected operation mode is dynamically modified to form a new media pathway. This new media pathway may also be compliant with the certification requirement. In step 512, the media-related operations are then continued over the new media pathway. Such pathway adaptation may be necessitated, for example, by pathway deterioration, processing bottlenecks (perhaps due to simultaneous multi-stream processing), processing node unavailability, costs, per the direction of a viewer, etc. Further, adaptive pathway transitions may require quality or performance downgrades or upgrades, such as may be necessitated if the new media pathway is not compliant with the certification requirement.

The following Figures illustrate integration of untrusted software and software frameworks (such as an Android framework) with secure operating system (OS) kernel environments within a secure device (such as a certified set top box device) in accordance with various embodiments of the present disclosure. As will be understood, such untrusted software components may be utilized in certain media pathways as permitted by application defined security requirements. In general, an OS kernel may be viewed as the heart (or ring 0) of the operating system, providing an interface between system hardware components and the rest of the operating system and installed applications. As described more fully below, a secure software abstraction layer is provided to isolate access to underlying software, hardware and secure components of the device.

Communications and data exchanges between untrusted software/frameworks and a secure OS kernel may occur via a secure access layer or interface comprised of a secure access client and secure access server (for example, elements 606, 612 and 616 of FIG. 6) that support an API and secure inter-process communication (IPC) calls or kernel drivers. In certain embodiments, the secure access client may be part of or accessible by a framework, while the associated secure access server is incorporated in a secure operating environment or executed as a secure kernel module. In operation, the secure access interface may help prevent system breaches or destabilization resulting from bad data or parameters by performing, without limitation, parameter validation/checking and peripheral range checking through hardware (when applicable), handle validation, direct/indirect heap pointer validation, heap isolation, and release of hardware resources following termination of a restricted process. The secure access server may limit access to server side libraries and return errors in response to invalid or illegal parameters passed by clients. The secure access interface may further perform watchdog functions to free resources reserved for runaway or unstable clients.

Software frameworks may support varying degrees of collaboration and dependencies between applications. However, the interfaces used by applications to provide services and communicate with other applications or an underlying operating system must be secured to defend against breaches and general malfeasance. As noted above in the Description of the Related Art, and without rigid hardware isolation and separate execution environments, the potential for execution of unauthorized code from an untrusted framework may compromise overall system security and negatively impact established certified or secured pathways absent methodologies and architectures (e.g., a secure access server) such as those described herein.

Figure 6:
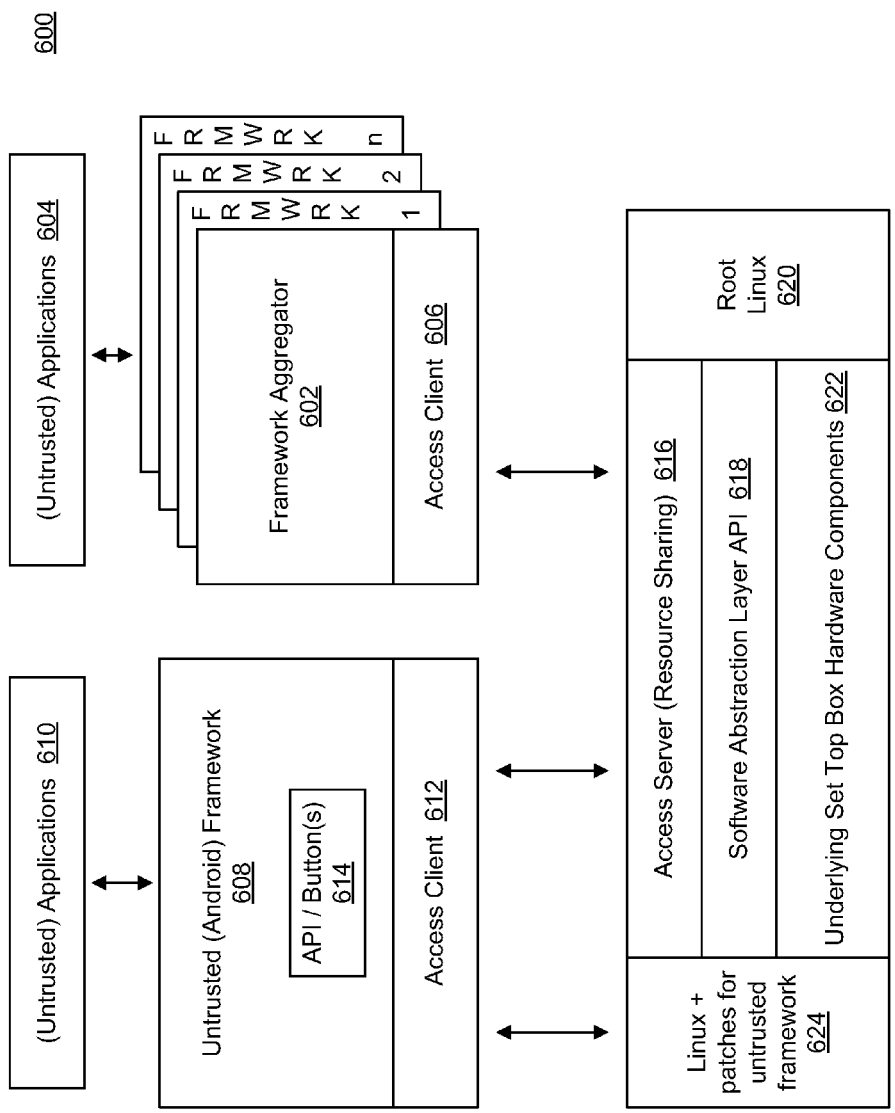
FIG. 6 illustrates an untrusted framework and a framework aggregator as clients of a secure operating system environment in accordance with various embodiments of the present disclosure.

Referring now to FIG. 6, an untrusted framework 608 and a framework aggregator 602 as clients of a secure operating system environment in accordance with various embodiments of the present disclosure is shown. In the illustrated embodiment, the framework "aggregator" 602 may be employed to embrace and extend operation with a wide variety of frameworks 1-n in order to support a wide variety of (untrusted) applications 604. In this manner, for example, a service provider can provide secure access to system resources to third party frameworks and other "middleware" offerings. Such offerings may include, by way of example and without limitation, ADOBE AIR®, ADOBE FLASH®, Apple iOS®, Microsoft SILVERLIGHT®, JAVA™ applets, and like side-by-side technologies. The framework aggregator 602 may include a set of tailored operating system libraries and HTML capabilities to support such technologies, as well as user interface web engine access, etc.

In certain embodiments, user interfaces supported by the framework aggregator 602 may enable a user to launch applications supported by the untrusted framework 608. For example, an Android framework 608 and/or framework aggregator 602 may offer a series of APIs or buttons 614, including an Android button that provides a visual display of available Android applications. Further, the Android framework 608 and framework aggregator 602 may share a graphics screen. In this manner, it may not be necessary to port functionality into the Android framework 608 that might otherwise be necessary. It is noted that in a given device, an Android framework 608 may be built using a different tool chain than that utilized by other frameworks supported by the framework aggregator 602, and support execution of a different set of applications 610.

In the illustrated embodiment, the untrusted framework 608 and the framework aggregator 602 can access a secure or trusted root operating system—such as Linux-based operating system 620—and/or underlying hardware, such as secure set top box hardware components 622, via an access server 616 operating in concert with access clients 606 and 612 and a software abstraction layer API 618. In this illustrated embodiment, an access client 612 enables secure communications between the untrusted framework and access server 616, while the framework aggregator 602 is similarly supported by an access client 606. Access server 616 and access clients 606 and 612 can be configured to incorporate DRM-related code that enables secure DRM operations involving relevant set top box functionality.

A complete or partial Linux operating system instance 624, including any necessary software patches, is provided to support execution of the untrusted framework 608, and the access client 612 may further function to govern communications between the untrusted framework 608 and the complete or partial Linux operating system instance 624. Linux kernel components of an Android software stack may include, for example, a display driver, a USB driver, a keypad driver, a WiFi driver, an audio driver, power management, a binder (IPC) driver, a Bluetooth driver, a flash memory driver, etc. In addition, the framework 608 may include an API or one or more buttons 614 that enable, for example, a visual display of available applications 610 (which may be executed on the untrusted framework 608 using, for example, application IPC calls).

In one embodiment, execution of the untrusted framework 608 (including components thereof, as well as untrusted applications 610) is performed using process isolation techniques. Such process isolation techniques may entail, for example, utilizing virtual address space where the address space for a first process is different than that of a second process. Inter-process memory access may be prohibited, or tightly controlled in certain implementations (e.g., where system policies permit processes to collaborate over IPC channels such as shared memory or local sockets).

Figure 7:
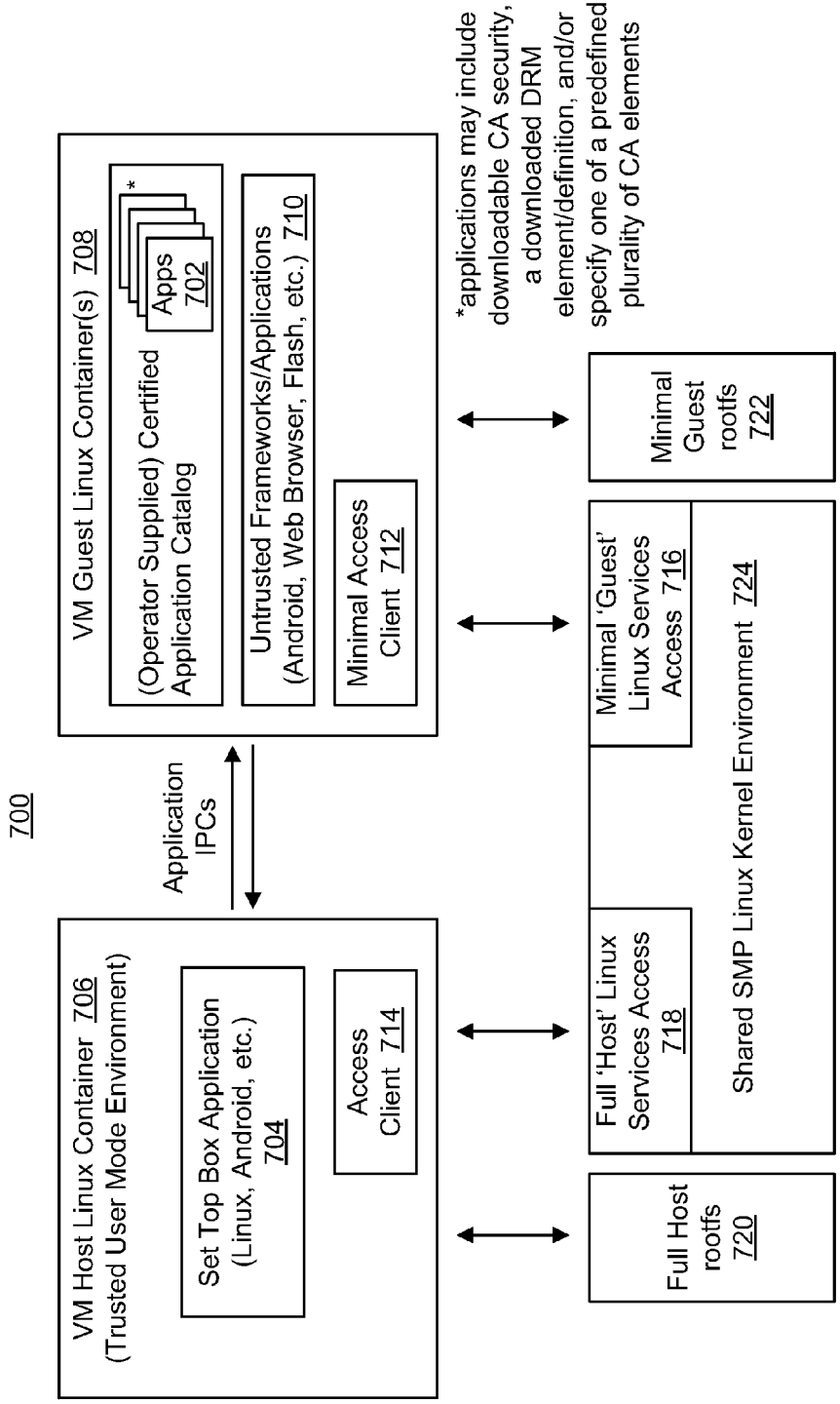
FIG. 7 illustrates a set top box architecture utilizing certified applications in accordance with various embodiments of the present disclosure.

FIG. 7 illustrates a set top box or other secure architecture 700 utilizing certified applications 702 (with associated security or certification definitions) in accordance with the present disclosure. In the illustrated embodiments, the certified applications 702 may be preinstalled or downloaded, for example, from a catalog of certified applications provided by a service operator or cloud-based source. Such applications might include, by way of example, media streaming applications (e.g., NETFLIX®), gaming applications, web browsing applications, iOS-based applications, Android applications, etc. In some embodiments, it may be necessary to incorporate or download additional operating systems to support corresponding classes of certified applications. Alternatively, different certified versions of a given application may be made available to support a variety of installed operating systems and/or frameworks 710. Certified applications 702 may be executed in one or more virtual machine containers 708 as described more fully below in conjunction with FIG. 8.

In the illustrated embodiment, untrusted client applications and frameworks interact with secure portions of an underlying set top box platform—including the set top box application 704, certified (operator supplied) applications 702 and secure Linux kernel environment 724 through application IPC calls and an access minimal client 712 that accesses minimal "guest" Linux services access 716. Likewise, applications in a trusted user mode (or "privileged") operating system environment receive full access to "host" Linux services access 718 via an access client 714. The trusted user mode environment can be supported by a full host root filesystem 720, while a minimal guest root filesystem 722 on a separate partition or disk can support the untrusted user mode (or "restricted") operating system environment.

In some embodiments, certain resources of a set top box platform, such as media processing and hardware acceleration resources (for audio/video encoding and decoding, rendering of 2D and 3D graphics using a standardized API (such as Open Graphics Library or "OpenGL"), DRM, encryption/decryption, etc.) and networking interfaces, may be accessed by untrusted client applications/frameworks 710 through IPC calls communicated through network sockets. Likewise, events such as IR control signals may be communicated from a set top box platform to untrusted client applications/frameworks 710 through IPC calls (such as a call into an Android API or button).

In one exemplary embodiment, the primary set top box application 704 is constructed as an Android application executed in a virtual machine container(s) 706. Depending on the capabilities of the relevant Android framework, non-standard API's or libraries may be required to support certain set top box functionality, such as PVR, picture-in-picture, transcoding, and channel tuning operations. Further, this approach may require special interfacing (e.g., passing a string to an interface to create an encode path as part of a hardware call) or provision of non-standard functions (or even applications) to address services and functions that may be lacking in a relevant framework or required for certification. For example, an Android framework might be extended to include non-standard functionality—without negatively impacting compatibility—by providing services that are "hidden" under the Android porting layers and receive and interpret uniform resource identifiers ("URIs") passed through such layers.

Figure 8:
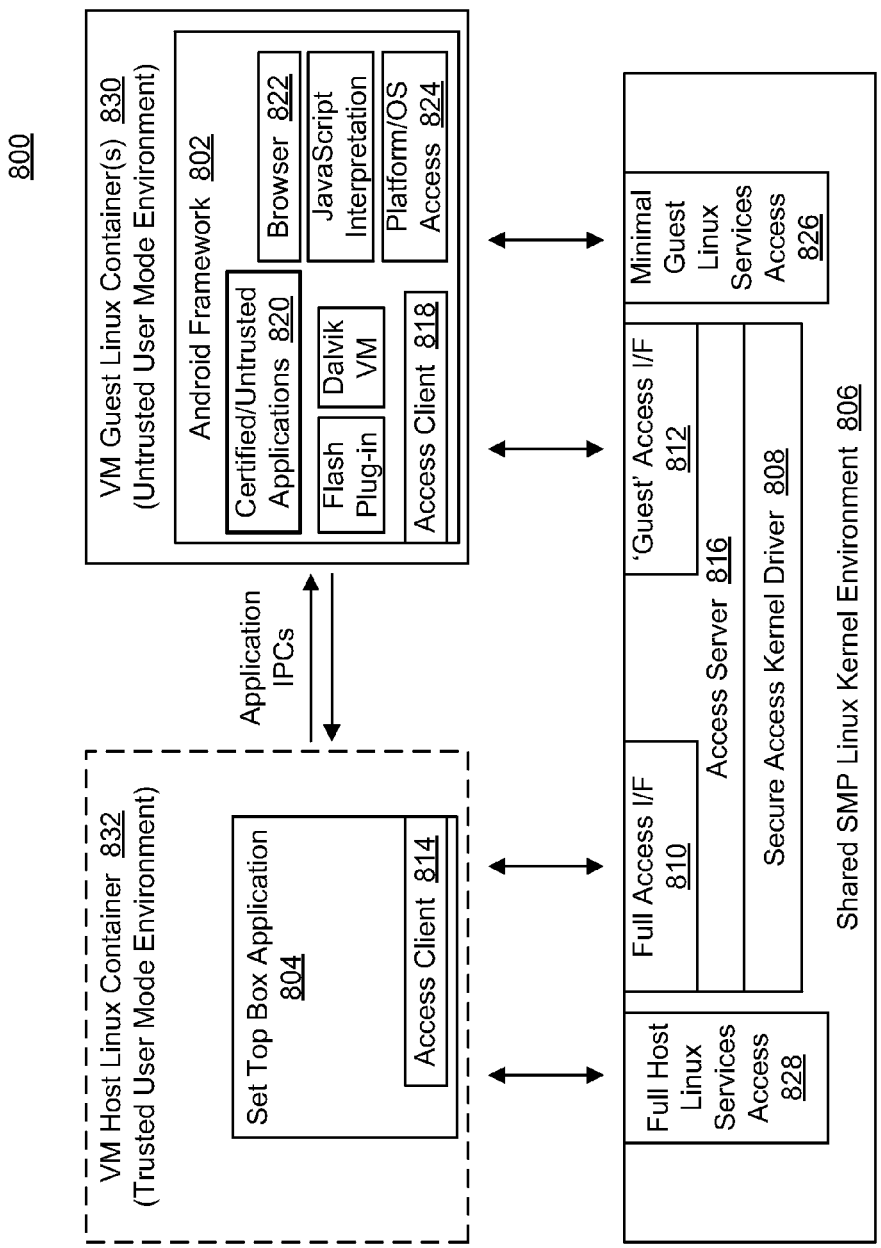
FIG. 8 illustrates an untrusted framework as a client of a set top box application in a virtualized environment in accordance with various embodiments of the present disclosure.

FIG. 8 illustrates an untrusted framework 802 as a client of a set top box application ("STB application") 804 in a virtualized environment in accordance with various embodiments of the present disclosure. As shown, a STB application 804 is provided to perform basic operations of a set top box 800, and interfaces with an untrusted "client" framework such as an Android framework 802. In this embodiment, the STB application 804 is executed in a secure or privileged Linux operating system kernel environment, such as a Symmetric Multiprocessing (SMP) Linux kernel environment 806, that includes a secure access kernel driver 808 and an access server 816 that includes a full access interface 810 for use by the STB application 804, and a more limited guest access interface 812 for use by the Android framework 802 via an access client 818. The STB application 804 includes access client 814 functionality that supports communications with the full access interface 810 and enables the Android framework 802 to run as an untrusted client of the secure Linux kernel environment 806 using, for example, container-based virtualization. As may be appreciated, the client/server architecture allows untrusted processes to crash or terminate without compromising underlying hardware and causing system instability.

In addition to an access client 818, the Android framework 802 of the illustrated embodiment may include trusted/certified and/or untrusted applications and application support

820, JavaScript interpretation, browser functions 822, plug-ins (e.g., an Adobe Flash plug-in), and a Dalvik virtual machine. In some embodiments, certified applications 820 may be downloaded from or supplied by a service operator, content provider, cloud-based source or the like. The Android framework 802 further includes platform or operating system access functionality 824 that enables limited access to necessary components of the secure Linux kernel environment 806 through a minimal guest Linux services access interface 826.

A variety of virtualization techniques may be employed in various embodiments according to the present disclosure, including implementations utilizing virtual systems running on either a shared operating system kernel or separate operating system kernels. Selection of a particular approach may depend on the required level of isolation, as well as availability of processing and memory resources. In the illustrated embodiment, the untrusted Android framework 802 is executed in a first virtual machine (VM) guest Linux container(s) 830 (such as an "LXC" or Linux resource container) to provide further isolation from secure processes and resources. In this embodiment, the STB application may similarly operate in a second VM host Linux container 832 having full host Linux services access 828. Briefly, and in general, container-based virtualization (or operating system-level virtualization) allows a kernel to run with a plurality of isolated virtual machines or virtual environments installed on top of it. Each virtual environment may be dedicated to run a particular application, and is typically not a complete operating system instance, but rather a partial instance of the operating system that works with a virtualization layer (or hardware resource abstraction layer) in the host operating system kernel.

Although virtualization may mitigate the need for hardware separation of untrusted components, in certain embodiments multiple processors having different levels of security may benefit from virtual container constructs which operate wholly via one of such processors, while other containers may span multiple processors. In one such embodiment, a first processor(s) may be dedicated to execution of non-secure functionality, while a second, secure processor(s) may be dedicated to conventional STB functionality. In various alternate embodiments, an untrusted framework may be hardware sandboxed via, for example, non-processor hardware/peripherals, memory isolation from processors and/or peripherals, etc. Various other divisions between secure and untrusted software and hardware are contemplated (e.g., dividing an untrusted framework or applications themselves into a "trusted" portion and an "untrusted" portion), examples of which are described below. Further, by utilizing hardware and operating system virtualization features, multiple operating systems may run simultaneously on the same hardware.

Figure 9:
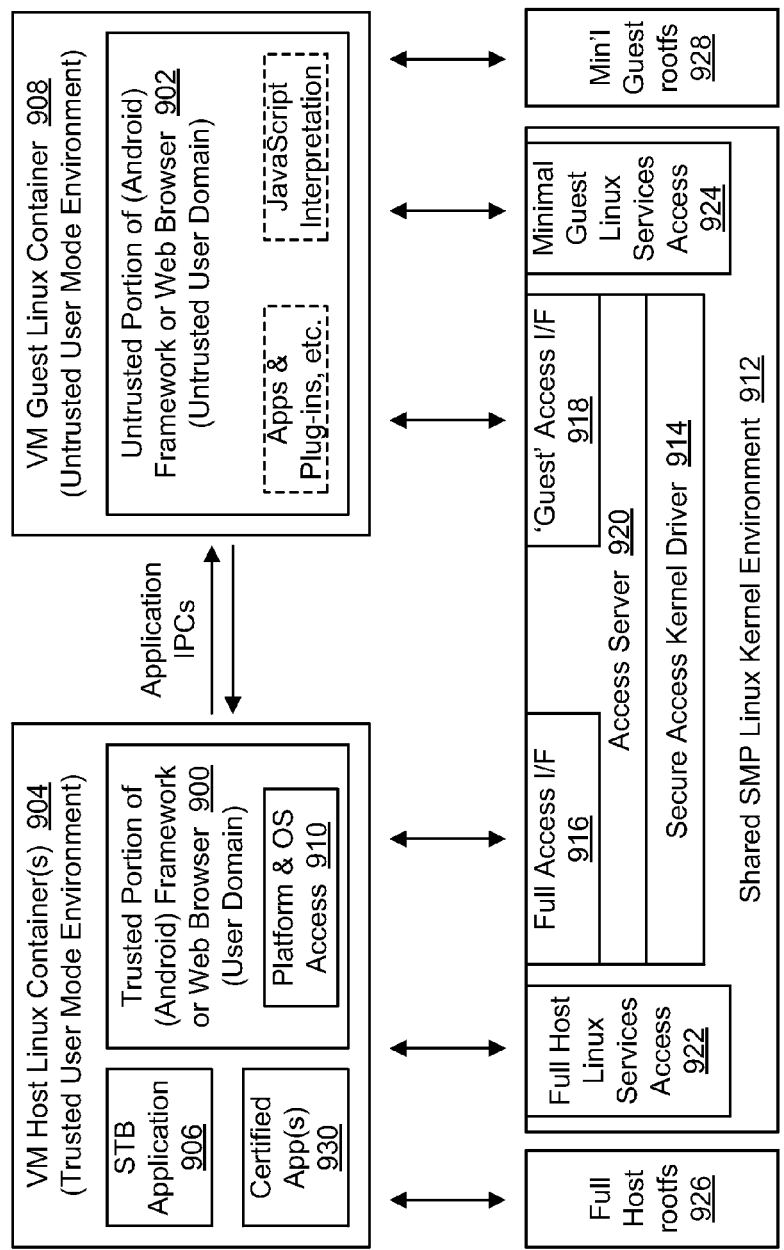
FIG. 9 illustrates partitioning of a framework into trusted and untrusted portions in accordance with an embodiment of the present disclosure.

FIG. 9 illustrates partitioning of a framework into trusted and untrusted portions 900 and 902 in accordance with an alternate embodiment of the present disclosure. In this embodiment, a trusted portion(s) 900 of a (Android) framework 900, web browser, etc., and a corresponding untrusted portion(s) 902 are executed in one or more separate virtual machine containers 904 and 908, respectively. The trusted portion 900 may include a secure platform and operating system access interface 910. In addition to the trusted portion 900, a set top box application 906, as well as trusted or certified applications 930, may operate in virtual machine container(s) 904.

Using an example involving a web browser, the portion of the browser that executes potentially unsafe Flash or JavaScript code (such as a rendering engine) can be executed in the "untrusted" virtual machine container 908 with limited file system and peripheral access, while the portion of the browser that has access to underlying platform hardware and sensitive operating system resources can be executed in one or more "trusted" virtual machine containers 904. In further embodiments, the trusted portion 900 may comprise a secure clone of a framework, or modified version of a framework that supports secure applications and/or secure portions of applications. In such embodiments, unsecure applications or portions thereof may be executed by portions of a framework residing in an untrusted or restricted user domain or container. Various approaches to hardware sandboxing may be employed to further isolate untrusted portions of a framework and to support restricted operating system domains or environments.

The secure Linux kernel environment 912 of this embodiment includes a secure access kernel driver 914 and an access server 920 that provides a full access interface 916 to support trusted user mode functionality and a guest access interface 918 to support untrusted user mode functionality. Full host Linux services access 922 and minimal guest Linux services access 924 are provided to the trusted and untrusted user mode environments, respectively. As above, the trusted user mode environment can be supported by a full host root filesystem 926, while a minimal guest root filesystem 928 on a separate partition or disk supports the untrusted user mode environment.

Figure 10:
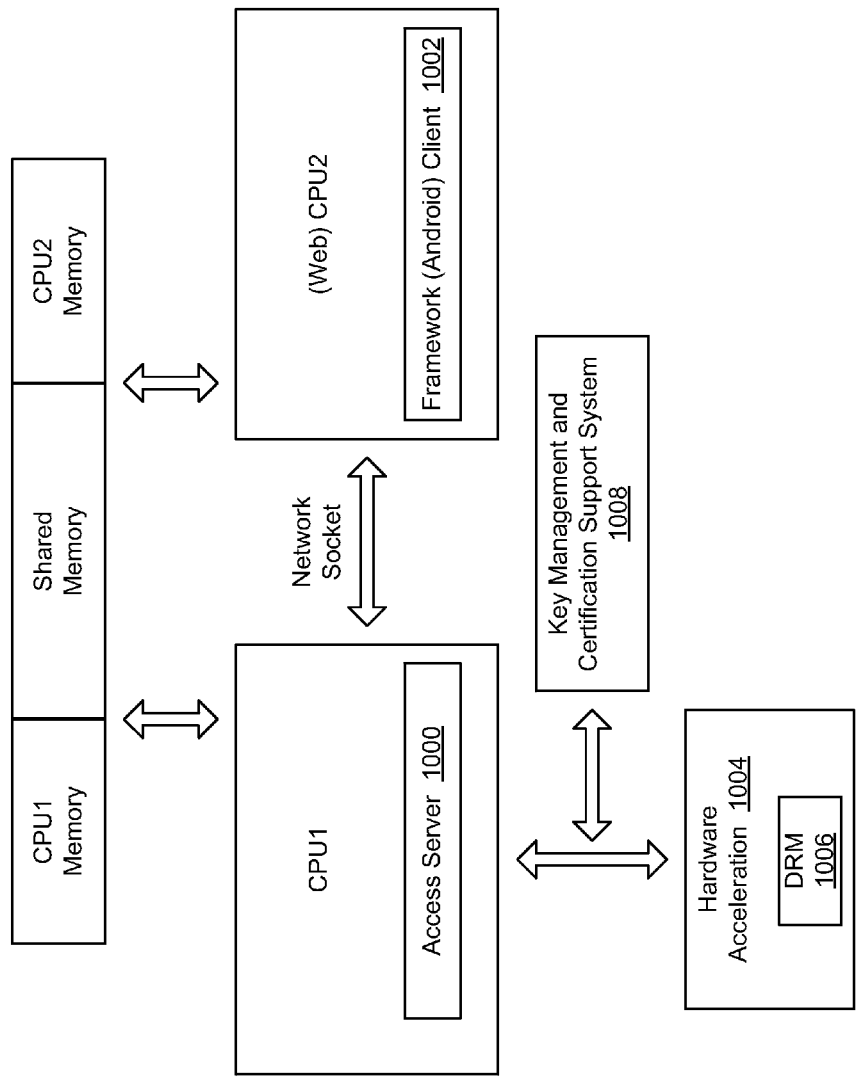
FIG. 10 is a block diagram of a multi-processor system supporting hardware segregation of operating system environments in accordance with various embodiments of the present disclosure.

FIG. 10 is a block diagram of a multi-processor system supporting hardware segregation of operating system environments in accordance with various embodiments of the present disclosure. For example, a first processor(s) CPU1 may be dedicated to conventional STB functionality and support a secure access server 1000, while a second processor(s) (web) CPU2 may be dedicated to execution of non-secure functionality and untrusted applications (e.g., an Android framework client 1002 or web browser). A trusted execution environment supported by CPU1 can limit access to certain core STB functionality, including hardware acceleration blocks 1004, DRM capabilities 1006, and the like. Access to and enablement of such components can be controlled by a key management and certification support system 1008, such as described more fully above.

In one embodiment, CPU1 and CPU2 are both segregated into separate and distinct zones when in a "sandboxing" mode. In another embodiment, the trusted CPU1 is set up having its own segregated regions of memory and also given access rights over some or all address ranges of memory mapped portions of CPU2. Generally, when operating in separate or segregated zones, environments or domains, the two CPUs operate on different applications, so that CPU1 executes one set of instructions, while CPU2 executes a different set of instructions. Segregation or separation of this nature is typically referred to as sandboxing or sandbox mode. The purpose of most sandboxing is to prevent one zone from accessing functionality in the other zone or to have controlled access of one zone into another. In some instances, both zones may be limited from having access to the other zone or only have controlled access between zones. In some applications, one zone may be regarded as a secure, privileged or trusted zone and the other as a restricted, non-secure or non-trusted zone, in which access by the applications operating on the non-secure zone are prevented or controlled from accessing certain applications running in the secure zone.

As noted above, a number of devices utilize multiple processors or processing cores to run separate programs, applications, etc. In a situation where one zone is not to have access to a second zone, one way to ensure this separation is by checking the accesses to the system memory. That is, by ensuring accesses that are allocated to CPU1 are not accessed by CPU2, unless the location of the access is a shared location, applications running on CPU2 may be prevented from breaching the functional separation. One way to achieve this protection is to provide an access check and access control to ensure that the correct processing module is accessing a permitted location for that processing module. In the illustrated embodiment, CPU1 and CPU2 may communicate directly through a network socket, IPC calls, etc.

Figure 11:
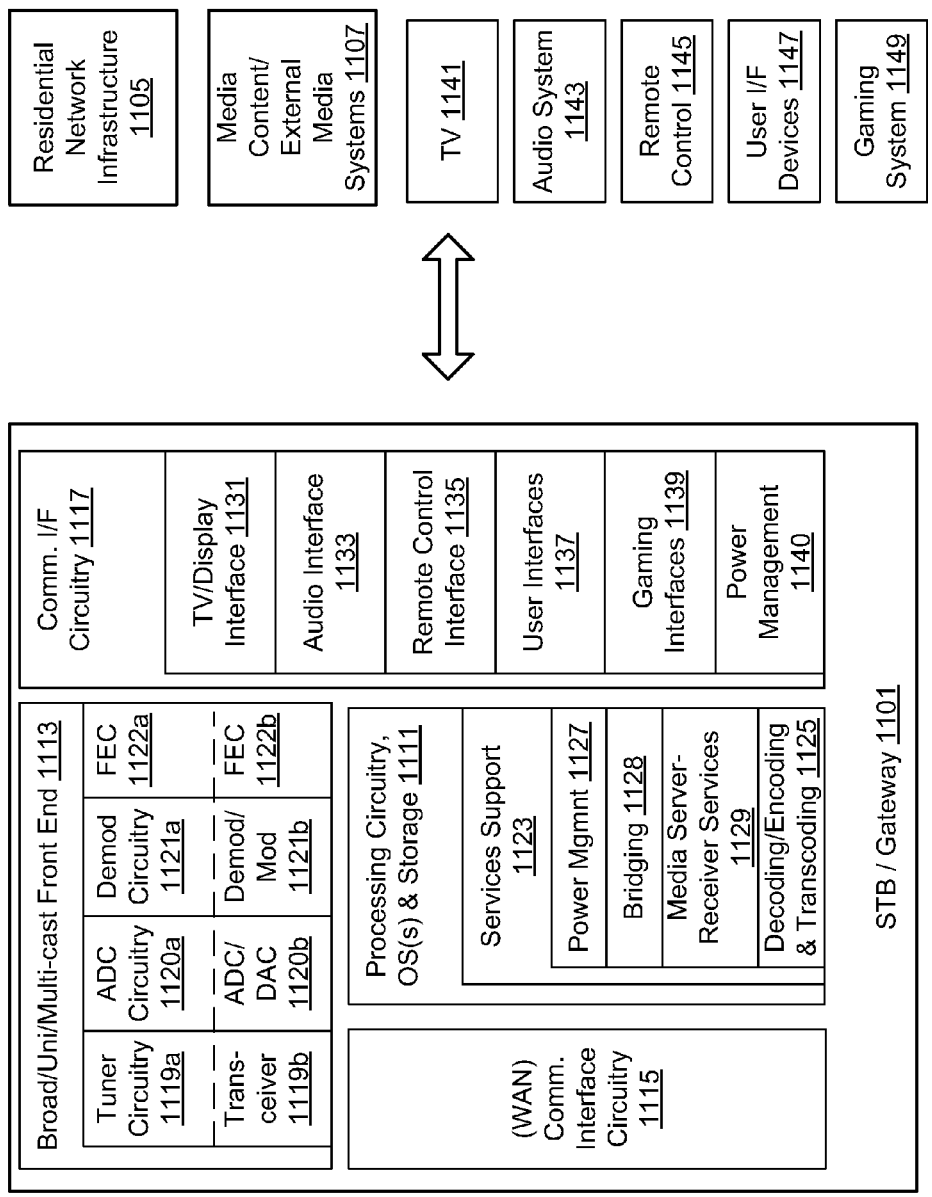
FIG. 11 is a schematic block diagram of a set top box (STB)/gateway (GW) in accordance with an embodiment of the present disclosure.

FIG. 11 is a schematic block diagram of a set top box (STB)/gateway (GW) 1101 in accordance with an embodiment of the present disclosure. The STB/gateway 1101 provides a number of functions, including conversion of signals from external sources into content that can be consumed by network devices. The STB/gateway 1101 may further operate as a gateway that supports unidirectional or bidirectional communications and bridging between network devices.

The STB/gateway 1101 of the illustrated embodiment interacts with a residential network infrastructure 1105 and external media systems 1107 via one or more wired and wireless networks/links. The wired and wireless networks/links may utilize one or more of various transmission media—such as coaxial cable, shielded twisted pair cable, fiber-optic cable, power line wires, and wireless media (radio frequencies, microwave, satellite, infrared, etc.)—and operate in accordance with a variety of communication and networking protocols (TCP/IP, UPnP, IPv6, etc.). In addition, the wired and wireless networks/links may comprise a multi-hop network utilizing a spanning tree protocol, direct wireless connections, peer-to-peer links, etc.

The external media systems 1107 may comprise, for example, one or more of cable, satellite and/or terrestrial televisions systems. Various headend equipment and services can be utilized by these systems, such as a cable headend that receives television signals for further processing and distribution, and may offer various other services such as internet connectivity and VoIP services.

The STB/gateway 1101 of the illustrated embodiment includes a broadcast/unicast/multicast front end 1113 that operates to receive uncompressed or compressed digital video, digital audio and other data signals, from either the external media systems 1107 or residential network infrastructure 1105, for further processing and distribution. The front end 1113 comprises tuner circuitry 1119a operable to isolate particular channels. Signals from the tuner circuitry 1119a are then provided to analog-to-digital (ADC) circuitry 1120a and demodulation circuitry 1121a for conversion into binary format/stream. Once in binary format, forward error correction (FEC) circuitry 1122a checks the integrity of the received binary stream. Audio, video, and data extracted from the binary stream may then be decoded (e.g., by decoding 1125) into formats suitable for consumption by downstream devices. It is noted that demodulation circuitry 1121a may support one or more modulation techniques, such as Quadrature Phase Shift Keying (QPSK), Quadrature Amplitude Modulation (QAM), Coded Orthogonal Frequency-Division Multiplexing (COFDM), etc.

The front end 1113 may be integrated into one or more semiconductor devices that may further support, for example, interactive digital television, networked DVR functionality, IP video over DOCSIS applications, and 3D graphics support. In addition, multiple tuner circuitry 1119a (including in-band and out of band tuners), ADC circuitry 1120a and demodulation circuitry 1121a may be provided for different modulation schemes and television standards (such as PAL, NTSC, ATSC, SECAM, DVB-C, DVB-T(2), DVB-H, ISDB, T-DMB, Open Cable).

In one alternative embodiment of the disclosure, functionality of the STB/gateway 1101 is performed by a smartphone or mobile computing device. In this embodiment, the "front end" 1113 comprises one or more wireless interfaces (including PHY and baseband functions), such as a cellular (3G, 4G, IMT-Advanced, etc.) or wide area network (HetNet, Wi-Fi, WiMax, etc.) interface. The interface may support one or more modulation and multiplexing techniques, such as OFDM, OFDMA, SC-FDMA, QPSK, QAM, 64QAM, CSMA, MIMO, etc. In the illustrated embodiment, the wireless interface comprises a transceiver 1119b, analog-to digital (ADC) and digital-to-analog (DAC) circuitry 1120b, demodulation and modulation circuitry 1121b and FEC (such as turbo codes or LDPC codes) circuitry 1122b. Encoding, decoding and transcoding 1125 functions may be provided by processing circuitry and storage 1111.

The STB/gateway 1101 also includes (wide area network) interface circuitry 1115 for communicating with residential network infrastructure 1105 and/or external media system 1107. Through the communication interface circuitry 1115, the STB/gateway 1101 may communicate directly with upstream resources, or offer (bidirectional) bridged communications between such resources and devices (e.g., devices 1141-1149) coupled to the STB/gateway 1101. As noted above, software applications hosted by the STB/gateway 1101 may work in concert with counterpart applications located in other devices of a media distribution network to provide appropriate security definitions and define media pathways of varying levels of security.

In the embodiment of FIG. 11, STB/gateway 1101 interacts with a variety of devices 1141-1149 via communication interface circuitry 1117. For example, a television or display interface module 1131 communicates with a (digital) television 1141 or other media display device to relay television programming and enable available interactive media services. In certain embodiments, the television or display interface module 1131 might include a remote user interface (RUI) server. Similarly, an audio interface 1133 provides audio programming or audio library access to an audio system 1143. The communication interface circuitry 1117 further comprises a remote control interface 1135 for receiving control signals from a remote control 1145. In addition to traditional remote control operations, the remote control 1145 may further offer voice and/or gesture control signals that are relayed or mapped to relevant consumer devices. User interfaces 1137 are also provided for communications with one or more user interface devices 1147. Gaming interfaces 1139 function to provide interactive communications with a gaming system 1149. Such communications may involve, for example, online, multiplayer gaming between members of a social network and/or external players in a gaming platform. Power management interface 1140 functionality is provided to enable power saving operations between devices 1141-1149.

The STB/gateway 1101 of the illustrated embodiment includes processing circuitry, operating system(s) and storage 1111 (components of which may be comprised of hardware, software, or combinations thereof), services support 1123, and decoding/encoding/transcoding functionality 1125 to support network interactions such as those described above. Services support 1123 in this embodiment includes various functions such as power management 1127, bridging 1128, and media server-receiver services 1129. Other traditional features of a STB/gateway may also be included. For example, the processing circuitry 1111 may include a system-on-a-chip or like device(s) that provide components such as a core processor, audio/video decoder, media processor/DSP, graphics core, encryption/decryption core, adaptive transcoding, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for establishing media pathways in a media processing device having at least one software application and a plurality of selectable components for use in supporting media pathways, the method comprising:
   determining security requirements associated with the software application, the security requirements including at least one of a digital rights management element or a conditional access element specified by the software application;
   identifying a set of the selectable components available for use in establishing a media pathway conforming to the security requirements;
   utilizing the set of selectable components to establish a media pathway to support operations of the software application, wherein the set of selectable components includes a plurality of selectable hardware accelerated pathway elements and a plurality of selectable software pathway elements, the media pathway including at least a selected one of the plurality of selectable hardware accelerated pathway elements and at least a selected one of the plurality of selectable software pathway elements, the media pathway further including the at least one of a digital rights management element or a conditional access element;
   performing media-related the media pathway;
   dynamically modifying the set of selectable components of the media pathway to form at least a portion of a new media pathway, the new media pathway compliant with the security requirements associated with the software application; and
   continuing media-related operations utilizing the new media pathway, wherein performing media-related operations utilizing the media pathway is performed on a first version of a media item, and continuing media-related operations utilizing the new media pathway is performed on a second version of the media item.

2. The method of claim 1, further comprising:
   performing media processing operations over the media pathway, the media processing operations supporting execution of the software application.

3. The method of claim 1, wherein the at least one of a digital rights management element or a conditional access element is provided by the software application.

4. The method of claim 1, the security requirements associated with the software application corresponding to a certification requirement for processing and delivery operations involving a particular media item or class of media items accessed via the software application.

5. The method of claim 1, further comprising:
   identifying a second set of the selectable components available for use in establishing a second media pathway, wherein the second set of selectable components includes a plurality of selectable hardware accelerated pathway elements and a plurality of selectable software pathway elements; and
   at the direction of the software application, selecting either the set of the selectable components or the second set of the selectable components for use in the step of utilizing the set of selectable components to establish a media pathway.

6. The method of claim 1, further comprising:
   exchanging information between the software application and a second software application, the security requirements associated with the software application based at least in part on the exchanged information.

7. The method of claim 6, wherein the second software application is an external software application residing on a media recipient device in a media consumption network involving the media processing device, the exchanged information relating to security requirements of the media recipient device.

8. The method of claim 1, further comprising:
   exchanging information between the software application and an external media source, the security requirements associated with the software application based at least in part on the exchanged information.

9. The method of claim 1, the media processing device further having a certified application programming interface for use by the software application in communicating security requirements, wherein determining security requirements associated with the software application is performed via the certified application programming interface.

10. The method of claim 1, further comprising:
    wherein dynamically modifying the set of selectable components is performed in response to determining unavailability or potential unavailability of at least one component of the set of selectable components included in the media pathway.

11. The method of claim 1, wherein the selected one of the plurality of selectable hardware accelerated pathway elements is configured to perform video decoding operations.

12. The method of claim 1, further comprising:
    detecting a resource conflict condition involving a component of the set of selectable components, wherein dynamically modifying the set of selectable components of the media pathway is performed in response to the resource conflict condition.

13. A method for establishing a certified pathway for utilization by a software application in a media processing device such as a set top box, comprising:
    identifying a plurality of potential operational modes of the media processing device, each of the operational modes specifying a set of selectable components forming at least a portion of a media pathway, each set of selectable components including a plurality of selectable hardware accelerated pathway elements and a plurality of selectable software pathway elements;
    determining a certification requirement associated with the software application;
    selecting one of the plurality of potential operational modes for use in media-related operations involving the software application, the selected operational mode compliant with the certification requirement, wherein the portion of the media pathway includes at least a selected one of the plurality of selectable hardware accelerated pathway elements and at least a selected one of the plurality of selectable software pathway elements;

performing media-related operations utilizing the selected operational mode;

dynamically modifying the set of selectable components of the selected operational mode to form at least a portion of a new media pathway, the new media pathway compliant with the certification requirement; and continuing media-related operations utilizing the new media pathway, wherein performing media-related operations utilizing the selected operational mode is performed on a first version of a media item, and continuing media-related operations utilizing the new media pathway is performed on a second version of the media item.

14. The method of claim 13, the certification requirement established by a media source.

15. The method of claim 13, the certification requirement established by a media source, further comprising:

selecting an additional one of the plurality of potential operational modes for use in media-related operations involving the software application, the additional operational mode compliant with the certification requirement; and performing multistream media-related operations utilizing the selected operational modes.

16. The method of claim 13, further comprising:

detecting a resource conflict condition involving a component of the set of selectable components specified by the selected operational mode, wherein dynamically modifying the set of selectable components of the selected operational mode is performed in response to the resource conflict condition.

17. A media processing device, comprising:

processing circuitry;

an operating system executed by the processing circuitry, the operating system configured to establish at least one privileged operating system environment and at least one restricted operating system environment;

a first set of selectable components controlled or executed by the at least one privileged operating system environment, the first set of selectable components including a plurality of selectable hardware accelerated pathway elements and a plurality of selectable software pathway elements;

a second set of selectable components controlled or executed by the at least one restricted operating system environment;

a software application having an associated certification requirement; and a key management and certification support system configured to establish a first media pathway utilizing at least the first set of selectable components, the first media pathway conforming to the certification requirement, the first media pathway including at least a selected one of the plurality of selectable hardware accelerated pathway elements and at least a selected one of the plurality of selectable software pathway elements, the key management and certification support system further configured to:

determine unavailability or potential unavailability of at least one component of the first set of selectable components included in the first media pathway;

identify at least one alternate set of selectable components conforming to the certification requirement associated with the software application; and dynamically establish a second media pathway utilizing at least one selectable component of the alternate set of selectable components, wherein the first media pathway supports media-related operations performed on a first version of a media item, and wherein the second media pathway supports media-related operations performed on a second, differing version of the media item.

18. The media processing device of claim 17, further comprising:

a certified application programming interface, executed by the processing circuitry, to communicate the certification requirement from the software application to the key management and certification support system.

19. The media processing device of claim 17, the certification requirement based, at least in part, on information provided to the software application by an external media source.

20. The media processing device of claim 17, wherein the second set of selectable components comprises components of a software framework.

* * * * *